United States Patent [19]
Green et al.

[11] 3,870,809
[45] Mar. 11, 1975

[54] STEAMING CAUSTIC TREATED, PEELED POTATOES TO LOOSEN AND REMOVE THE EYES AND DEFECT PORTIONS THEREOF

[75] Inventors: Glen R. Green; Jay B. Bennion, both of Ontario, Oreg.

[73] Assignee: Ore-Ida Foods, Inc., Ontario, Oreg.

[22] Filed: Jan. 22, 1973

[21] Appl. No.: 325,618

[52] U.S. Cl. .................. 426/287, 426/482, 426/483
[51] Int. Cl. ............................................... A23l 1/12
[58] Field of Search .................... 426/287, 482, 483

[56] References Cited
UNITED STATES PATENTS

| | | | |
|---|---|---|---|
| 206,934 | 8/1878 | Davis | 426/483 |
| 2,399,282 | 4/1946 | Miller | 426/287 |
| 2,847,334 | 8/1958 | Kilburn | 426/287 |
| 3,017,298 | 1/1962 | Wilson | 426/287 |
| 3,370,627 | 2/1968 | Willard | 426/482 |
| 3,460,162 | 8/1969 | Sijbring | 426/483 |
| 3,517,715 | 6/1970 | Graham | 426/287 |
| 3,547,173 | 12/1970 | Graham | 426/287 |

*Primary Examiner*—A. Louis Monacell
*Assistant Examiner*—Martin G. Mullen
*Attorney, Agent, or Firm*—Mallinckrodt & Mallinckrodt

[57] ABSTRACT

Following the usual caustic dipping of whole, unpeeled, raw potatoes, for loosening the skins, and subsequent treatment thereof by exposure to hot air and by abrasive scrubbing for removal of the loosened skins, the so-peeled potatoes, still containing most of the eyes and any defects that might exist, are subjected to further treatment for a period of time by exposure to steam which activates residual caustic in such eyes and defects and loosens the same. The potatoes are thereafter washed to remove the loosened eyes and defects and to produce unusually clean potatoes substantially free of skin, eyes, and defects and ready for final specking procedures. There is minimum loss of potato flesh by this procedure.

4 Claims, 1 Drawing Figure

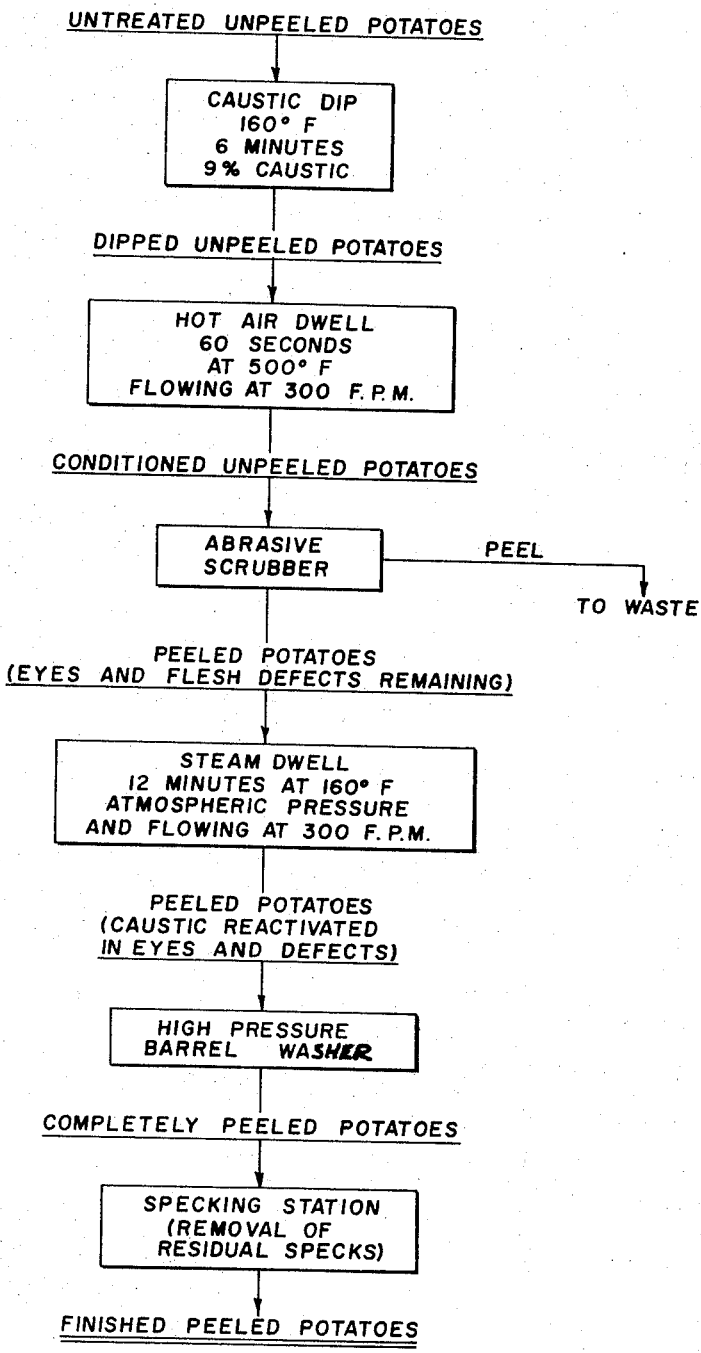

STEAMING CAUSTIC TREATED, PEELED POTATOES TO LOOSEN AND REMOVE THE EYES AND DEFECT PORTIONS THEREOF

BACKGROUND OF THE INVENTION

1. Field

The invention is in the useful art of industrial peeling of potatoes prior to the production of a variety of commercial potato products.

2. State of the Art

This art has been an active one, since maximum skin, eye, and defect removal, with minimum loss of potato flesh, is and has long been the aim of industrial producers of commercial potato products. These factors are of great importance in obtaining both consumer acceptance of the commercial products and satisfactory economic returns for the processors. Many different approaches have been taken to the problems involved, but caustic dip procedures, followed by various peel-removal procedures, have been favored. One successful approach has been the use of infra-red heating of the caustically dipped potatoes prior to abrasive scrubbing in a so-called "dry" waste removal step. This process is disclosed in U.S. Pat. No. 3,517,715 issued under date of June 30, 1970. Here, however, after the peeling operation, the potatoes are given a brief dip in dilute acid to neutralize any trace of the caustic which may collect in the eyes and other natural crevices, and in defective portions of the potatoes. A later successful process developed by the same inventors, see U.S. Pat. No. 3,547,173, involves caustic dip followed by a holding period at elevated temperature for loosening the skin prior to peeling by abrasive scrubbing. The so-peeled potatoes are then washed with jets of water for removal of residual skin.

SUMMARY OF THE INVENTION

In accordance with the present invention, the unpeeled raw potatoes are first treated with caustic in conventional manner, except that it is preferred to utilize a somewhat lower temperature and a somewhat longer time than is ordinarily employed for the purpose. The caustically treated potatoes are then held for a period of time at elevated temperature, preferably exposed to hot air. With the skin loosened in this manner, the potatoes are subjected to conventional "dry" scrubbing for peel removal. Following this, the so-peeled potatoes are held for a period of time exposed to steam, which is preferably at atmospheric pressure and circulated by a fan. The steam activates residual caustic in the eyes and other natural crevices, and in defective portions caused by extraneous factors during growth or by bruising during harvesting or subsequent handling. This loosens the eyes and the skin remaining in other crevices, and also loosens defective flesh portions of the potatoes. Thereafter, the potatoes are subjected to washing treatment for removal of the loosened eyes, deep-lying skin, and defective flesh portions. The potatoes are thus placed in unusually clean condition for the normal specking operation prior to their utilization in the production of commercial potato products, such as French fries, hash brown, etc.

THE DRAWING

The best mode presently contemplated for carrying out the invention in practice is illustrated in the accompanying drawing, in which the single FIGURE is a flow sheet showing preferred specific procedures as sequential steps of the process.

DETAILED DESCRIPTION OF THE ILLUSTRATED EMBODIMENT

In a typical application of the process, whole, unpeeled, raw potatoes are subjected to a caustic dip at a temperature of about 160° F. for a period of about six minutes. Any suitable apparatus may be employed for the purpose, for example, the dip tank or tanks customarily utilized in conventional caustic peeling processes. For the particular temperature and time indicated, a concentrated solution of about nine percent NaOH is preferred.

The so-treated potatoes, whose skins are loosened by the caustic with minimum effect on the flesh portions, are passed, as by means of a conveyor belt, through apparatus designed to bring hot air into intimate contact therewith for a period of time. A period of about 60 seconds contact with hot air at about 500° F. flowing at a rate of about 300 feet per minute has been found to be an optimum for potatoes of normal grade size.

The foregoing treatment aids in loosening the potato skins and prepares the potatoes for what has become known as "dry" peeling in an abrading type of scrubber, such as the so-called "Magnu-Scrubber" manufactured by Magnuson Engineers, Inc., San Jose, California, for the purpose. Such abrasive scrubbing removes the loosened skins.

In accordance with the present invention, the so-peeled potatoes are then subjected to steaming in any suitable vessel preferably being passed from scrubber to steaming vessel on a continuous conveyor traveling at such speed as will maintain the potatoes within the steam atmosphere for about 12 minutes. The steam is preferably at a temperature of about 160° F. and at atmospheric pressure and is moved over and around the exposed surfaces of the potatoes by a fan or blower. This effectively activates residual caustic in the eyes and other as-yet-unpeeled areas and in and around any defective flesh portions of the potatoes and effects localized caustic action that loosens such eyes and defective flesh portions.

The peeled potatoes, with reactivated caustic in localized areas, are then subjected to the flushing action of wash water, as by being passed into suitable washing apparatus, such as a high pressure barrel type washer, wherein the loosened eyes and other deep-lying skin and defective flesh portions are flushed free of the otherwise completely peeled potatoes, thereby placing such potatoes in unusually clean condition for the customary final "specking" operation.

Whereas the invention is here illustrated and described in terms of specific details of the best mode presently contemplated for carrying it out in practice; it is to be understood that many changes can be made without departing from the inventive concepts here taught and set forth in the following claims.

We claim:

1. A process for peeling potatoes, comprising the steps of treating the entire surface of raw unpeeled potatoes with caustic, the strength of the caustic and the length of time it is applied to the potatoes being effective to loosen the potato skins; abrasively scrubbing the potatoes for removing the loosened skins from superficial surfaces thereof; subjecting the so-peeled potatoes still containing eyes and defective portions having residual caustic present therein to the action of steam to effect localized caustic action of said residual caustic in said eyes and defective portions of the potatoes to loosen said eyes and defective portions; and water-flushing the thereby loosened eyes and defective portions from the otherwise peeled potatoes.

2. A process according to claim 1, wherein the steam has a temperature of about 160° F., flows at a velocity within the range of about 250 to about 350 feet per minute, and is substantially at atmospheric pressure during the steaming stage.

3. A process according to claim 1, wherein the caustic action step includes conditioning prior to abrasive scrubbing, said conditioning comprising intimately contacting the so-treated potatoes with hot air, the temperature of the air and the length of time it is applied to the potatoes being effective to further loosen and partially dry the skins.

4. A process according to claim 3, wherein the hot air has a temperature of about 500° F., flows at a velocity of about 300 feet per minute, and is substantially at atmospheric pressure during the conditioning stage.

* * * * *